(12) United States Patent
Barajas Gonzalez et al.

(10) Patent No.: US 10,747,734 B2
(45) Date of Patent: Aug. 18, 2020

(54) DATA DEDUPLICATION WITHIN DISTRIBUTED COMPUTING COMPONENTS

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 568 days.

(21) Appl. No.: 15/189,232

(22) Filed: Jun. 22, 2016

(65) Prior Publication Data

US 2017/0371904 A1  Dec. 28, 2017

(51) Int. Cl.
*G06F 17/00* (2019.01)
*G06F 16/215* (2019.01)
*H04L 29/08* (2006.01)
*G06F 16/13* (2019.01)

(52) U.S. Cl.
CPC .......... *G06F 16/215* (2019.01); *G06F 16/137* (2019.01); *H04L 67/1097* (2013.01)

(58) Field of Classification Search
CPC ............. G06F 11/3485; G06F 17/3002; G06F 17/30082; G06F 17/30156; G06F 17/302
USPC .......................................................... 707/704
See application file for complete search history.

(56) References Cited

U.S. PATENT DOCUMENTS

| | | | |
|---|---|---|---|
| 8,280,861 B1 | 10/2012 | Park et al. | |
| 9,171,008 B2 | 10/2015 | Prahlad et al. | |
| 2011/0161723 A1* | 6/2011 | Taleck | G06F 11/1453 714/4.11 |
| 2012/0137054 A1 | 5/2012 | Sadri et al. | |
| 2013/0054523 A1 | 2/2013 | Anglin et al. | |
| 2014/0229440 A1* | 8/2014 | Venkatesh | G06F 3/061 707/634 |
| 2017/0220593 A1* | 8/2017 | Tripathy | G06F 16/1744 |

* cited by examiner

*Primary Examiner* — Truong V Vo
(74) *Attorney, Agent, or Firm* — Griffiths & Seaton PLLC

(57) ABSTRACT

Embodiments for, in an object storage environment, deduplicating data within and between distributed computing components by a processor. A deduplication operation is paired with metadata associated with a data object to determine data necessitating deduplication before the data object is transferred and written to a local node.

18 Claims, 10 Drawing Sheets

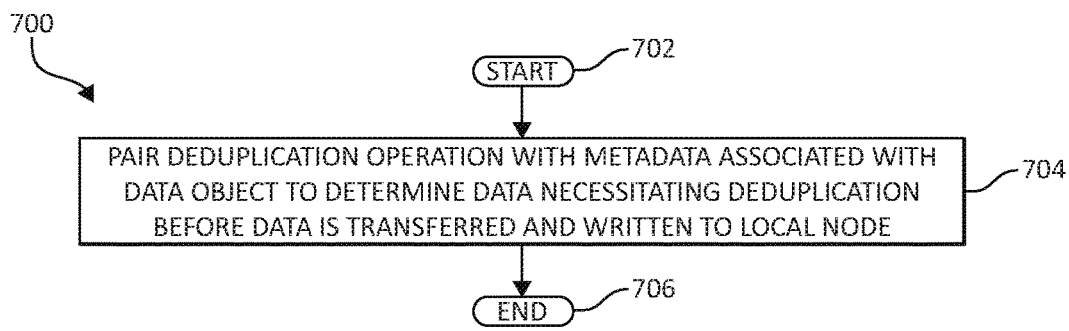
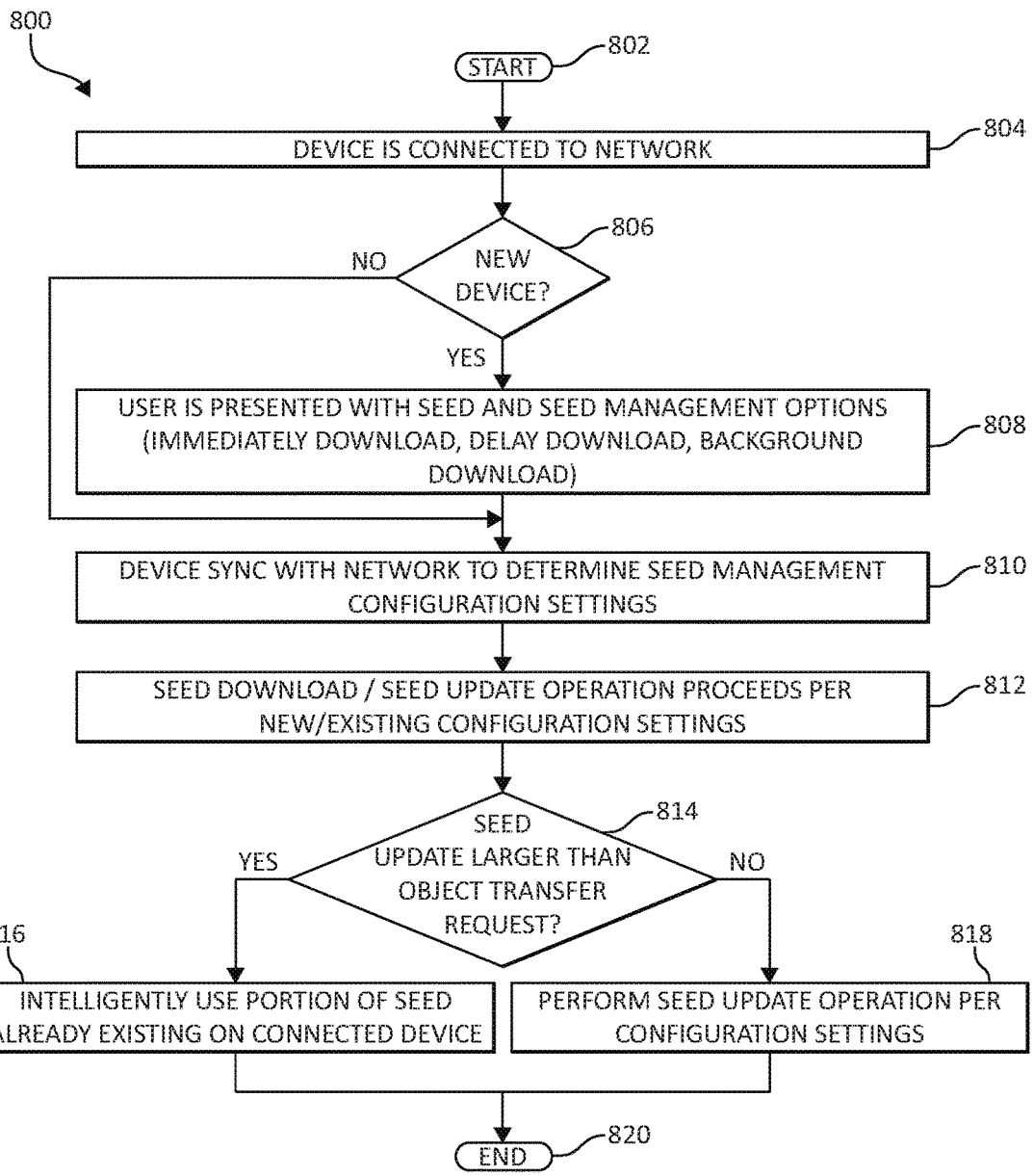

DATA DEDUPLICATION WITHIN DISTRIBUTED COMPUTING COMPONENTS

BACKGROUND OF THE INVENTION

Field of the Invention

The present invention relates in general to computing systems, and more particularly to, various embodiments for data deduplication within and/or between distributed computing components.

Description of the Related Art

In recent years, the storage and management of data has shifted dramatically from a local computing location, such as a personal computer or workstation, to centralized systems that may be distributed globally across a wide variety of locations. Hosted, so-called "cloud" data management has become increasingly popular due to a variety of reasons, such as the redundancy of data, the ease of management and lower capital cost of not having to procure storage infrastructure, and other factors.

SUMMARY OF THE INVENTION

Various embodiments for, in an object storage environment, deduplicating data within and between distributed computing components by a processor, are provided. In one embodiment, by way of example only, a method for, again in an object storage environment, deduplicating data within and between distributed computing components by a processor is provided. A deduplication operation is paired with metadata associated with a data object to determine data necessitating deduplication before the data object is transferred and written to a local node.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a flow chart diagram depicting an exemplary method for deduplicating data within and between distributed computing components by a processor, again in which aspects of the present invention may be realized;

FIG. 8 is an additional flow chart diagram depicting an exemplary method for seed management; again in which aspects of the present invention may be realized;

DETAILED DESCRIPTION OF THE DRAWINGS

Figure 1:
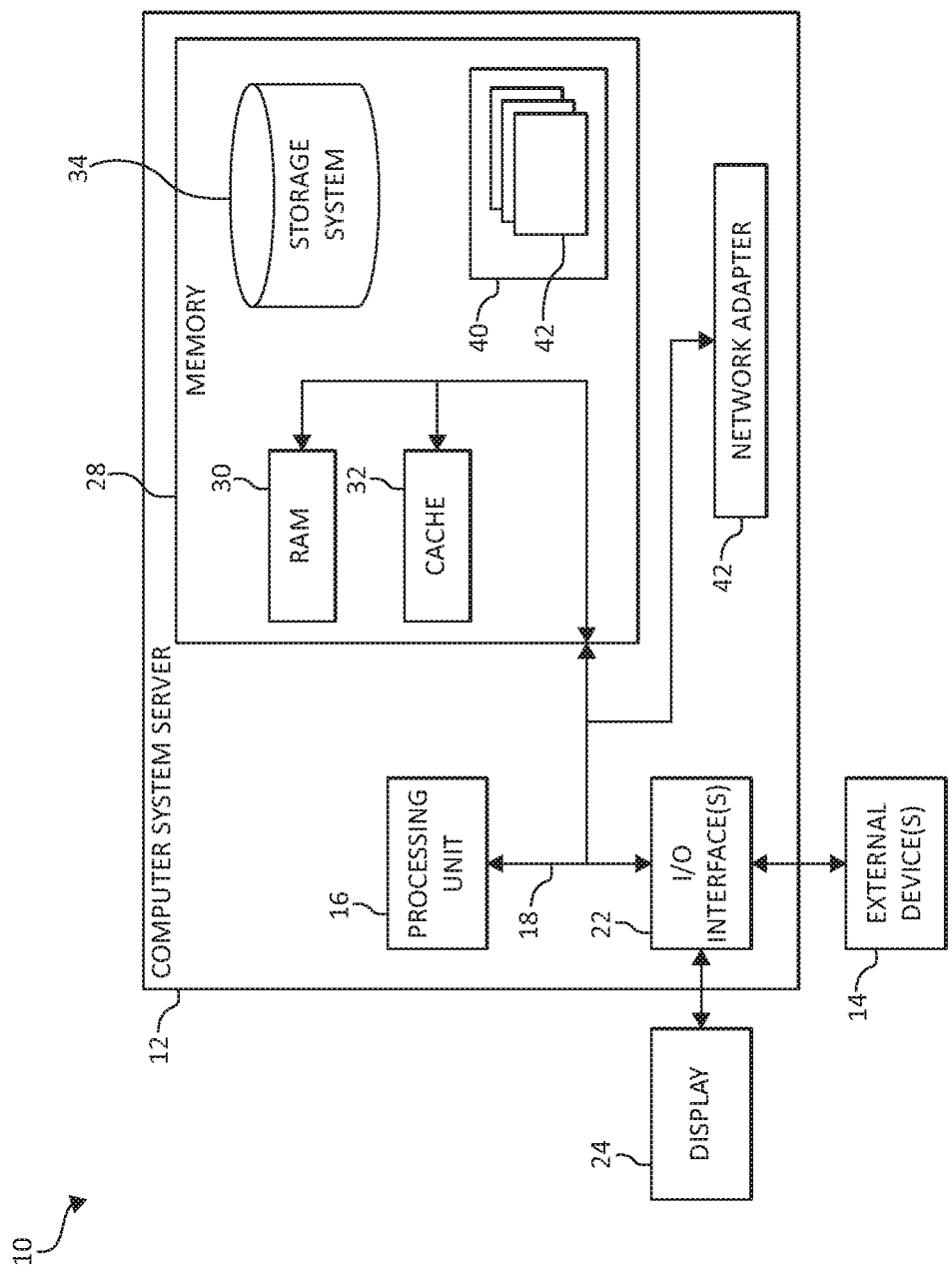
FIG. 1 is a block diagram depicting an exemplary cloud computing node according to an embodiment of the present invention.

As previously indicated, data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

As storage requirements have grown, many techniques for increasing available capacity have evolved. So-called data deduplication allows duplicate copies of data to be minimized to a single physical copy. Data deduplication, traditionally, has been limited to locally-based applications. Because, however, of the potential for deduplication to drastically reduce the amount of physical storage in storage environments, the allure of using deduplication techniques in a wide variety of storage scenarios, and not just in local storage environments, has increased.

Currently, data deduplication implementations are found within environments where data is locally accessible. Data deduplication is generally currently consigned to a system with a dedicated number of disks. For example, a data deduplication implementation may be implemented as part of a local storage system. A device may perform read and write operations to the local storage system, where the incoming and outgoing data passes through a data deduplication mechanism as part of a generalized storage operation that is undertaken on the local storage system.

Localized storage systems with an array of dedicated disks are being phased out in favor of a distributed computing environment, where data may be distributed across many systems within a cloud environment, for example. As previously mentioned, with the advent of cloud-based and other distributive computing systems, the need for a robust data deduplication system that functions across distributed computing components and systems becomes increasingly important. As of yet, however, deduplication functionality has largely not addressed this growing need.

Accordingly, traditional block-based deduplication implementations are not currently being scaled into widely disbursed, distributed computing environments, such as distributed object storage systems. When working in traditional deduplication implementations, typically every block-set device map of the data undergoing deduplication must be queried on each storage system in a particular computing environment to determine if the data has been previously seen. However, within a distributed computing environment, hundreds of interconnected systems may be configured, and the time frame for querying every block-set device map in such an environment proves to be too resource intensive, costly and inefficient using current deduplication techniques.

In view of the foregoing, and to address the foregoing needs, the mechanisms of the illustrated embodiments, among other aspects, make use of object metadata that is an inherent component within object storage to perform deduplication functionality within and throughout distributed computing components. In one embodiment, for example, the mechanisms of the present invention pair deduplication functionality with the object metadata to make determinations as to what data needs deduplication. These determinations may be made before the data is, for example, replicated to another storage site, or written to a particular storage site.

By their very nature, large, distributed computing environments are configured to accommodate a large volume of information. Accordingly, because of this large volume of information, an attendant large amount of data is required to be deduplicated on an environment-wide basis. As a result, the introduction of data deduplication functionality within and throughout large, distributed computing environments may result in a significant amount of data deduplication, leading to significant resource savings and other benefits.

Consider the following example. A user is uploading a 10 GB file into a cloud-based storage environment, and the file will be stored in a remote physical location from the user thousands of miles away. The cloud-based environment then performs data deduplication functionality according to mechanisms of the illustrated embodiments, as will be detailed, and realizes a 40% duplicate ratio on the 10 GB data file. As a result, the cloud based environment must only upload (and correspondingly incur the bandwidth and resource usage) of a 6 GB file to the remote physical location, resulting in a significant amount of data space, resource, and bandwidth savings of 4 GB.

In one embodiment, the present invention makes use of two parts, or "modules." A first part/module may be termed a "local module" and a second part/module may be termed a "remote module," as will be further described. The local module may, for example, execute on each client accessing the object storage environment, while the remote module may be executed by the object storage environment itself, existing within one or more of the distributed computing components (such as within a cloud-based storage environment). The functionality associated with the remote and local modules, along with other aspects of the illustrated embodiments will be described in further detail below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
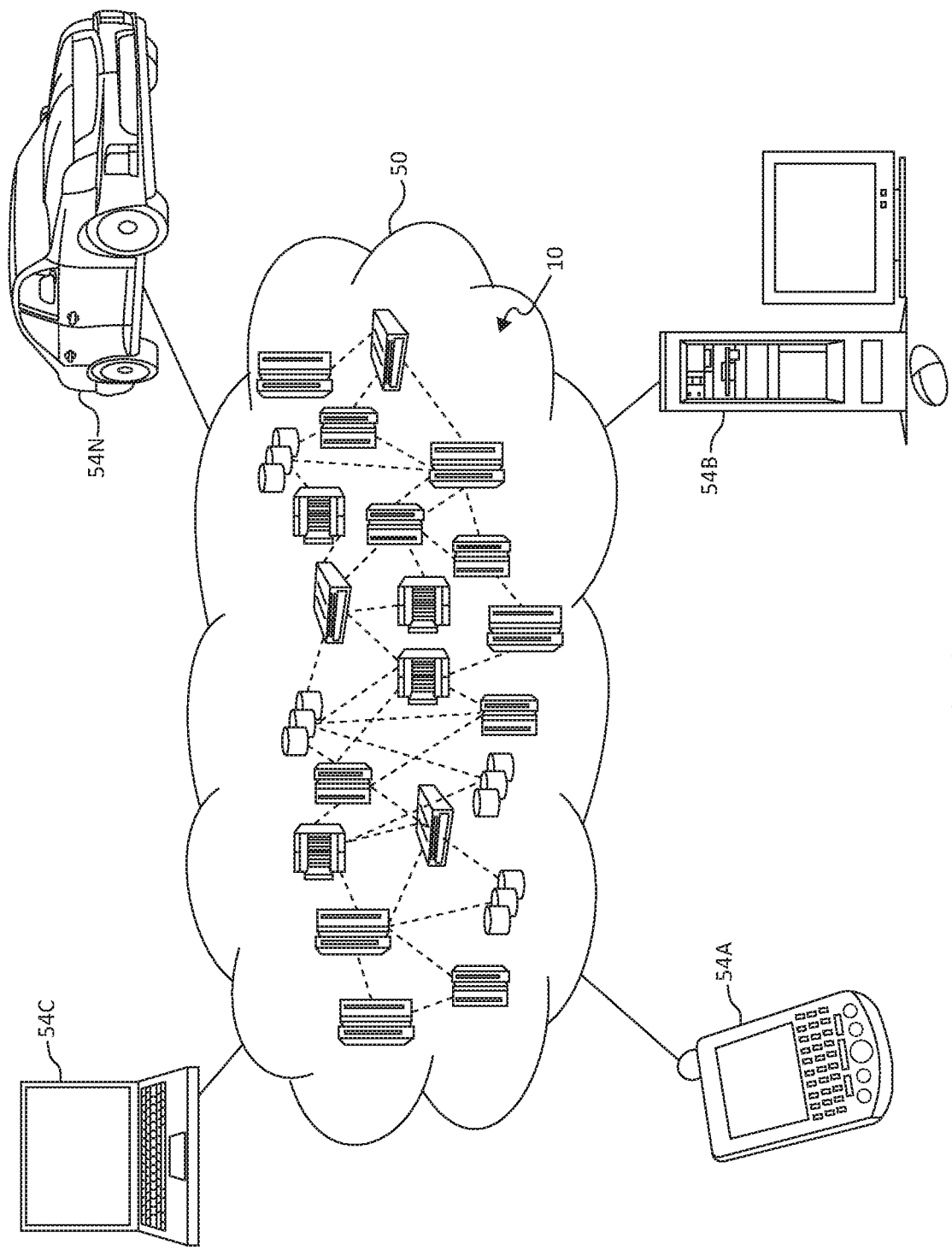
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
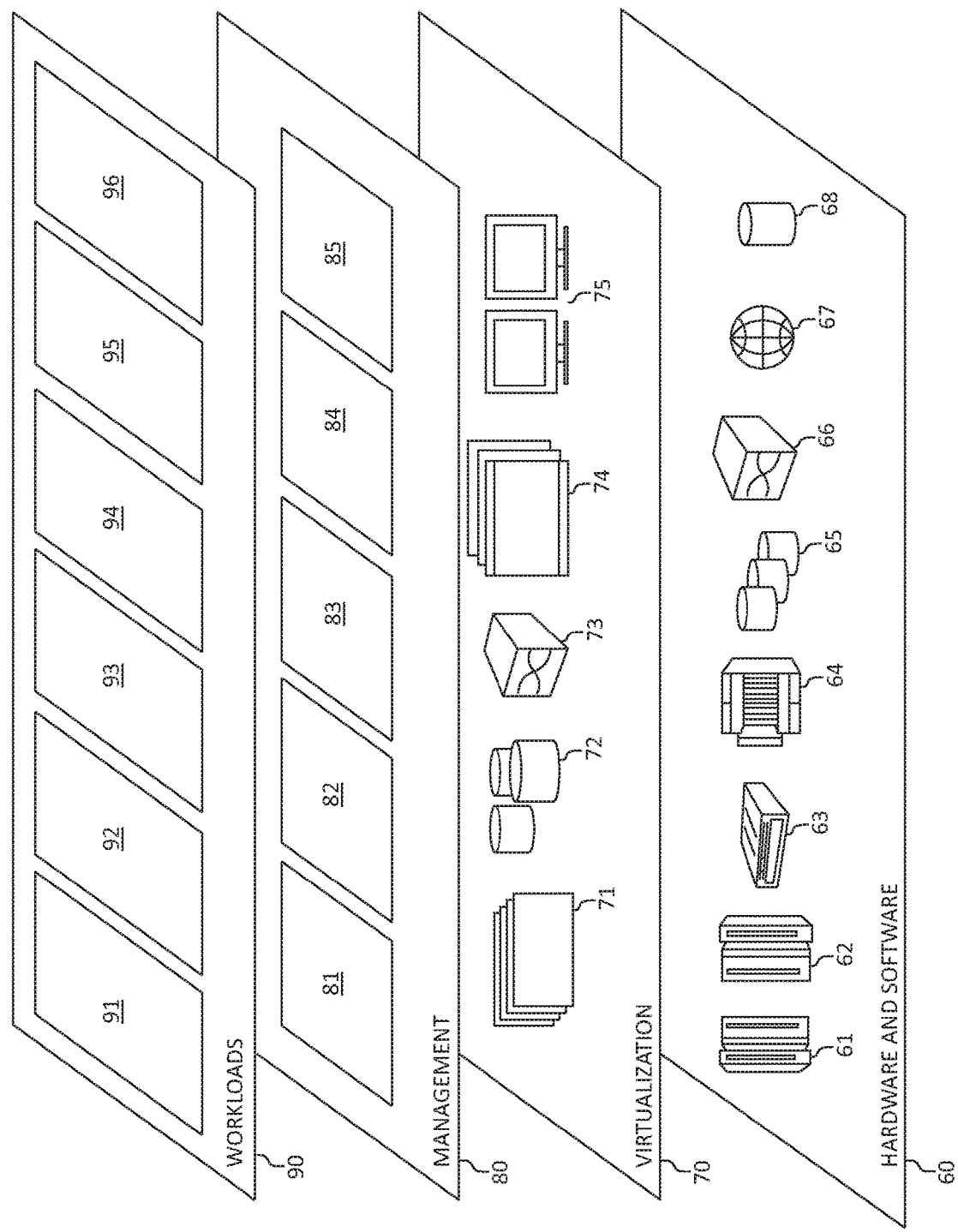
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data deduplication workloads and functions 95. In addition, data deduplication workloads and functions 95 may include such operations as metadata analytics, metadata analysis, and as will be further described, seed management functions. One of ordinary skill in the art will appreciate that the data deduplication workloads and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
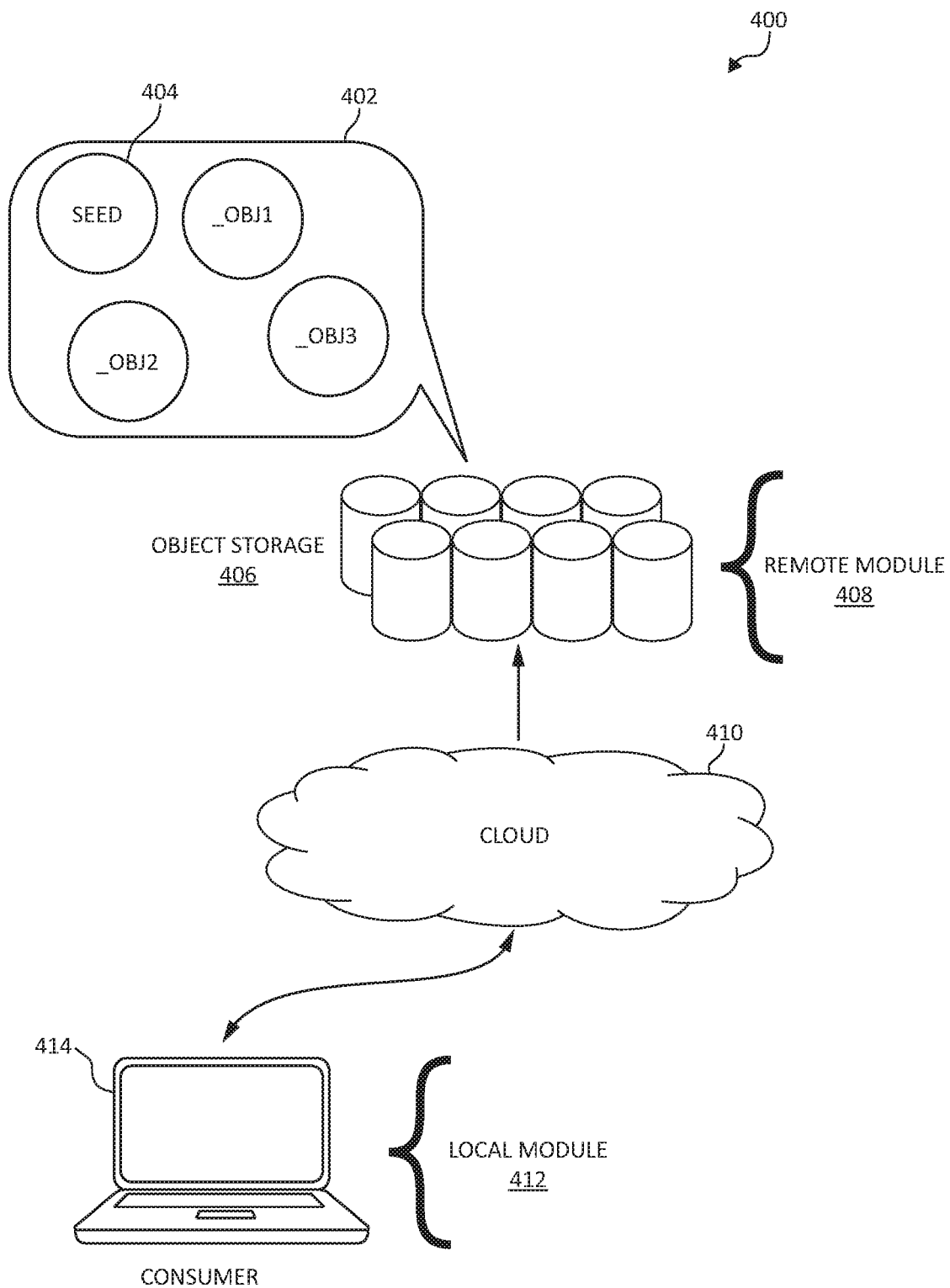
FIG. 4 is an additional block diagram depicting various cloud computing components functioning in accordance with aspects of the present invention.

Turning now to FIG. 4, a block diagram depicting exemplary functional components 400 according to various mechanisms of the illustrated embodiments, is shown. A collection of data objects (i.e., _Obj1-_Obj3) and a seed 404 are collectively designated as data 402, and accommodated within an object storage environment 406. Object storage environment 406 may, in one embodiment, be a local node in a widely distributed storage environment of computing components.

In addition to data 402, seed 404, and object storage 406, a remote module 408 is also executing on the object storage 406. An interconnected network (here designated as cloud 410) provides the appropriate communications link between the consumer machine 414 (which houses local module 414) and the object storage system 406. As will be further described, the mechanisms of the present invention, among other aspects, anticipate the data processing that may occur as between the local device (e.g., consumer machine 414) and the device's interaction with distributed computing components accommodating a remotely located object storage, perhaps in a number of widely distributed portions as facilitated through the cloud 410. For illustrative purposes, the functional components 400 depict the relationship between the remote module, executing on the object storage 406 itself, and the local module executing on the consumer machine 414). The functionality associated with the local module 412 and the remote module 408 in the overall context of a distributed computing environment will be further described herein.

Figure 5:
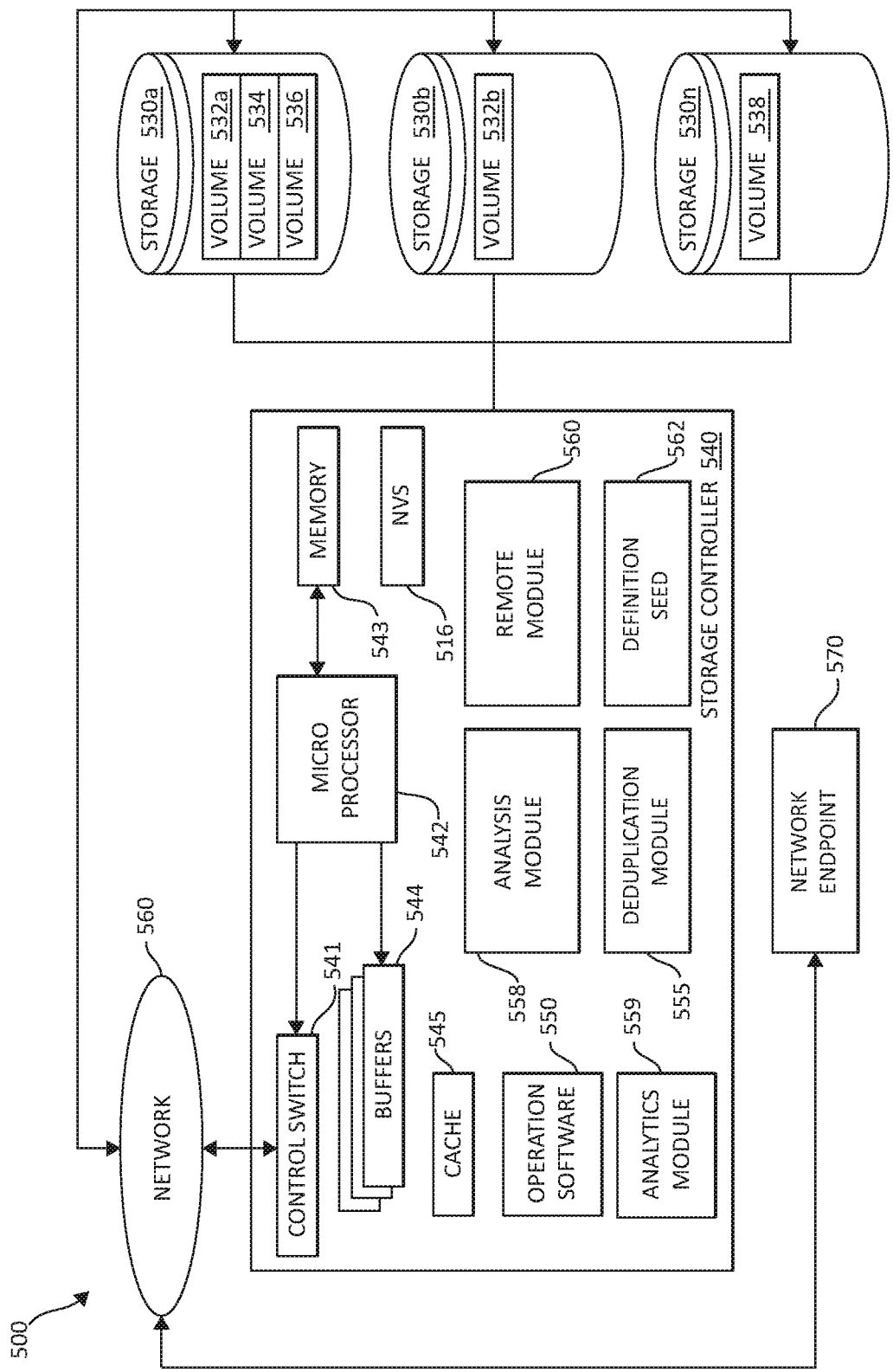
FIG. 5 is an additional block diagram depicting an exemplary hardware structure, operational in an overall context of distributed computing components, for deduplicating data within and between distributed computing components by a processor, in which aspects of the present invention may be realized.

FIG. 5, following, is an additional block diagram showing a hardware structure of a data management system 500 that may be used in the overall context (i.e., as a portion of a distributed computing environment) of performing functionality according to various aspects of the present invention.

Network 560 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 5) or network adapter 560 to the storage controller 540, such as Fibre channel, FICON, ESCON, Ethernet, fiber optic, wireless, or coaxial adapters. Network management system 500 is accordingly equipped with a suitable fabric (not shown in FIG. 5) or network adaptor 560 to communicate.

To facilitate a clearer understanding of the methods described herein, storage controller 540 is shown in FIG. 5 as a single processing unit, including a microprocessor 542, system memory 543 and nonvolatile storage ("NVS") 516. It is noted that in some embodiments, storage controller 540 is comprised of multiple processing units, each with their own processor complex and system memory, and interconnected by a dedicated network 560 within data storage system 500.

In a local or remote location, yet connected over network 560, storage 530 (labeled as 530a, 530b, and 530n herein) may be comprised of one or more storage devices, such as storage arrays, which are connected to storage controller 540 (e.g., by a storage network) as shown.

In some embodiments, the devices included in storage 530 may be connected in a loop architecture. Storage controller 540 manages storage 530 and facilitates the processing of write and read requests intended for storage 530. The system memory 543 of storage controller 540 stores program instructions and data, which the processor 542 may access for executing functions and method steps of the present invention for executing and managing storage 530 as described herein. In one embodiment, system memory 543 includes, is in association with, or is in communication with the operation software 550 for performing methods and operations described herein. As shown in FIG. 5, system memory 543 may also include or be in communication with a cache 545 for storage 530, also referred to herein as a "cache memory," for buffering "write data" and "read data," which respectively refer to write/read requests and their associated data. In one embodiment, cache 545 is allocated in a device external to system memory 543, yet remains accessible by microprocessor 542 and may serve to provide additional security against data loss, in addition to carrying out the operations as described herein.

In some embodiments, cache 545 is implemented with a volatile memory and non-volatile memory and coupled to microprocessor 542 via a local bus (not shown in FIG. 5) for enhanced performance of data storage system 500. The NVS 516 included in data storage controller 540 is accessible by microprocessor 542 and serves to provide additional support for operations and execution of the present invention as described in other figures. The NVS 516, may also be referred to as a "persistent" cache, or "cache memory" and is implemented with nonvolatile memory that may or may not utilize external power to retain data stored therein. The NVS 516 may be stored in and with the cache 545 for any purposes suited to accomplish the objectives of the present invention. In some embodiments, a backup power source (not shown in FIG. 5), such as a battery, supplies NVS 516 with sufficient power to retain the data stored therein in case of power loss to data storage system 500. In certain embodiments, the capacity of NVS 516 is less than or equal to the total capacity of cache 545.

Storage 530 may be physically comprised of one or more storage devices, such as storage arrays. A storage array is a logical grouping of individual storage devices, such as a hard disk. In certain embodiments, storage 530 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 5 may include a logical volume, or simply "volume," may have different kinds of allocations. Storage 530a, 530b and 530n are shown as ranks in data storage system 500, and are referred to herein as rank 530a, 530b and 530n. Ranks may be local to data storage system 200, or may be located at a physically remote location. In other words, a local storage controller may connect with a remote storage controller and manage storage at the remote location. Rank 530a is shown configured with two entire volumes, 534 and 536, as well as one partial volume 532a. Rank 530b is shown with another partial volume 532b. Thus volume 532 is allocated across ranks 530a and 530b. Rank 530n is shown as being fully allocated to volume 538—that is, rank 530n refers to the entire physical storage for volume 538. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 570 is connected through the network 560 as shown. The network endpoint 570 is generically intended to refer to any number of network devices, such as a switch, a router, a wireless access point, or another device known generally to one of ordinary skill in the art. As will be further illustrated in the following figures, a user may use a networked device, (e.g., a device connected to network 560) to access the network 560. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 560 is anticipated to use the network endpoint 570. In one embodiment, the depiction of a network endpoint 570 serves to provide a point where an input object (data object) is introduced into a distributed computing environment, as will be described.

The storage controller 540 may include a deduplication module 555, an analysis module 558, a remote module 560, and one or more seeds 562 (e.g., tables of information as will be further described), among other functional components. The deduplication module 555, analysis module 558, remote module 560, and seeds 562 may operate in conjunction with each and every component of the storage controller 540, and storage devices 530. The deduplication module 555, analysis module 558, remote module 560, and seeds 562 may be structurally one complete module or may be associated and/or included with other individual modules. The deduplication module 555, analysis module 558, remote module 560, and seeds 562 may also be located at least partially in the cache 545 or other components, as one of ordinary skill in the art will appreciate.

The deduplication module 555, analysis module 558, remote module 560, and seeds 562 may individually and/or collectively perform various aspects of the present invention as will be further described. For example, the deduplication module 555 may perform various deduplication operations in accordance with aspects of the illustrated embodiments, such as designating certain duplicate data with a reference to the physical location of the data in lieu of a duplicate instance of physical storage. The analysis module 558 may use data analytics to identify, organize, create, delete, sequester, or perform other actions on various patterns, trends, and other characteristics identified in the tracked data over the network 560 and between other distributed computing components in the distributed computing environment. Remote module 560 may perform various seed updates and management operations, such as syncing seed information contained in the object storage environment with that of a local user, and so forth. Finally, each of the various fields and table entries (as will be described), may be stored, organized, retrieved, and deleted in the seeds 562. As one of ordinary skill in the art will appreciate, the deduplication module 555, analysis module 558, remote module 560, and seeds 562 may make up only a subset of various functional and/or functionally responsible entities in the data storage system 500.

Other ancillary hardware may be associated with the storage system 500. For example, as shown, the storage controller 540 includes a control switch 541, a microprocessor 542 for controlling all the storage controller 540, a nonvolatile control memory 543 for storing a microprogram (operation software) 250 for controlling the operation of storage controller 540, data for control, cache 545 for temporarily storing (buffering) data, and buffers 544 for assisting the cache 545 to read and write data, a control switch 541 for controlling a protocol to control data transfer to or from the storage devices 530, the deduplication module 555, analysis module 558, remote module 560, seeds 562, or other blocks of functionality, in which information may be set. Multiple buffers 544 may be implemented with the present invention to assist with the operations as described herein.

Figure 6:
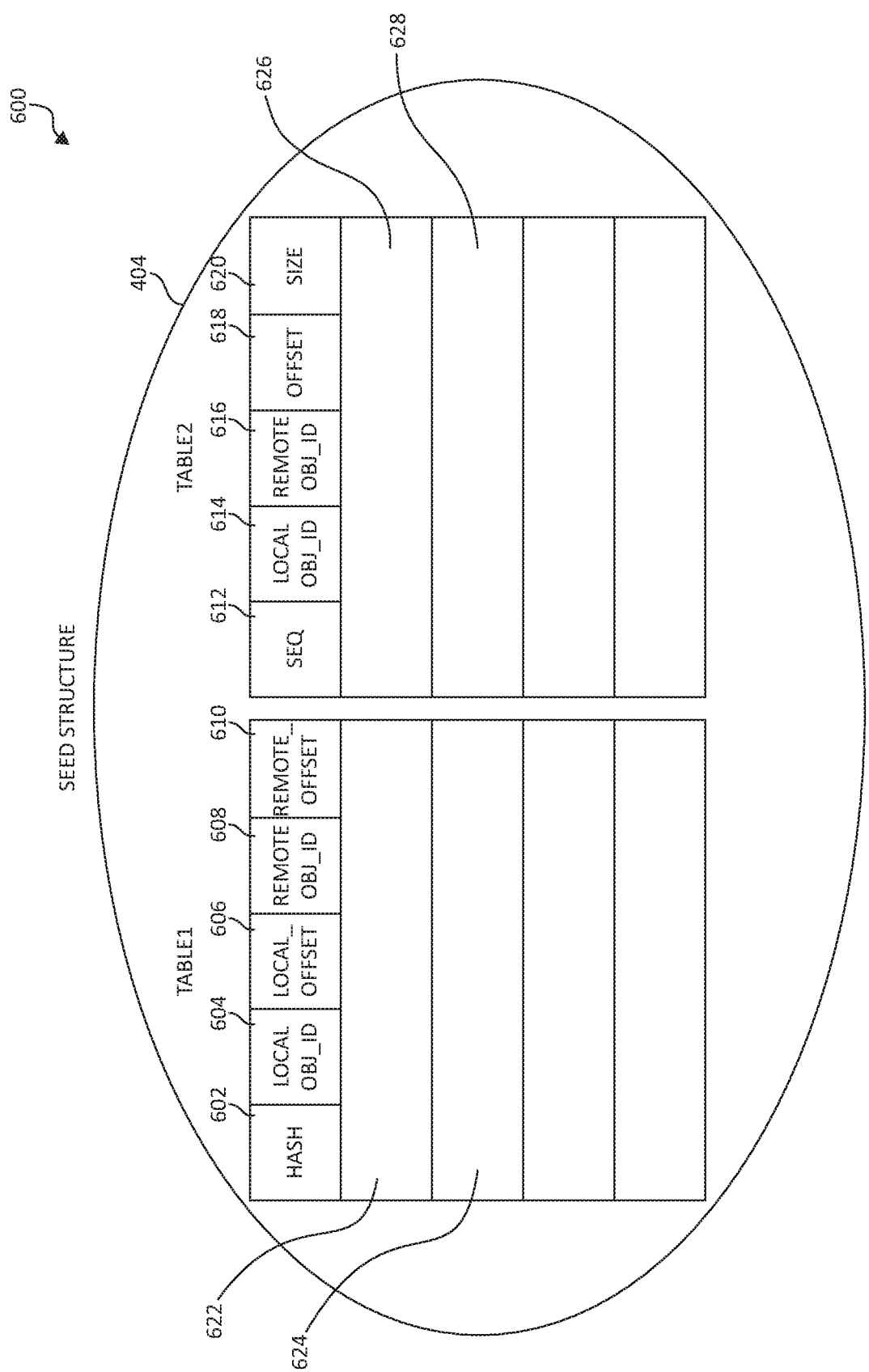
FIG. 6 is an additional block diagram depicting exemplary structural components of a seed, in which aspects of the present invention may be realized.

Turning now to FIG. 6, a block diagram of exemplary functionality 600 associated with a seed 404 (FIG. 4) is depicted, for use in the overall context of performing data deduplication operations within and between distributed computing components. In the depicted embodiment, seed 600 incorporates two table structures (e.g., table1 and table2) as shown. Each of the tables contains descriptive fields pertaining to data objects that are stored in the distributed computing environment as will be further described.

Table1 includes a hash value field 602, local object ID field 604, local offset field 606, remote object ID field 608, and remote offset field 610. In turn, table2 includes sequence field 612, local object ID field 614, remote object ID field 616, offset field 618, and size field 620. In each of the respective tables are various rows (e.g., rows 622, 624, 626, and 628) that are populated with metadata information pertaining to a particular data object. In one embodiment, the seed 404 encapsulates the various information pertaining to the data objects stored within and between the distributed computing components, and as will be seen, reference to the information incorporated into the seed 404 by either a connected device, or by one of the distributed computing components, may alleviate the necessity of physical movement of a particular data object between the connected device and/or the distributed computing components, among other benefits.

Exemplary functionality of the seed 404 within the overall context of a distributed computing framework will be further described, following. First, however, turning to FIG. 7, an exemplary method 700 for deduplicating data within and between distributed computing components is depicted, in which various aspects of the present invention may be realized. Method 700 begins (step 702) by pairing a deduplication operation with metadata associated with a particular data object to determine data necessitating deduplication before the data object is transferred and/or written to a local node within and between the distributed computing components (step 704). The method 700 then ends (step 706).

As previously mentioned, the seed 404, in one embodiment, may be used in the overall context of facilitating deduplication operations within and between distributed computing components by conveying metadata information pertaining to particular storage objects to portions of the distributed computing components. The computing component then may leverage the metadata information to determine if data deduplication is warranted on the data object, before the data object is further processed (i.e., stored, transferred, etc.).

In view of this overview of the seed 404, a variety of seed management functions may be undertaken within the distributed computing environment. In one embodiment, periodic background seed replication may be intelligently triggered, and accomplished based upon the capabilities of those devices connected to the object storage devices. For example, mobile devices (smartphones, PDA devices, etc.) may be configured with a default setting to perform seed exchange operations during periods when the devices are charging and connected to high-speed network connections to facilitate data transfer.

In another embodiment, due to the possibility of a seed file growing beyond what may be acceptable bandwidth constraints in a particular setting, a device may be presented (via one or more distributed components) with an option to bypass a particular seed update operation entirely at a particular time, such as when uploading new data objects. Further, in cases where a seed update operation is deemed to be larger than a particular object transfer request, the distributed computing components may elect to intelligently use only that portion of the seed file that currently exists on the connected device. While this instant scenario may reduce overall effectiveness of deduplication functionality at the current time, overall bandwidth efficiency of the object storage environment is enhanced.

In another embodiment, in cases of new devices being connected to the object storage environment in the distributed computing components, the user may be presented with a size of the seed file, and an option to immediately download the seed file, delay the download of the seed file, or initiate download of the seed as a background process. Recommendations to the user may be made based on the object storage environment's analysis of the network connectivity of the connected device and other processing considerations that would be apparent to one of ordinary skill in the art.

With the foregoing in view, consider now FIG. 8, which is a flow chart of an exemplary method 800 for performing seed management functionality within and between connected devices and an object storage environment within distributed computing components, in which aspects of the present invention may be implemented. Method 800 begins (step 802) with a device (smartphone, PDA, etc.) being connected to the object storage environment (step 804). If the device is a new device (step 806), the user is presented with the seed file, and seed management options (step 808). For example, the user may choose to immediately download the seed file, delay the download until a later time (for example, at night), or perform the seed download as a background process. As one of ordinary skill in the art will appreciate, the object storage system may also perform automated configuration operations concerning the seed file, such as determining the applicable bandwidth of the connected device, or other network analytics, and either selecting an appropriate seed management operation and/or providing a recommendation to the user.

Returning to step 806, if the device is not a new device, the method 800 moves to step 810, where the device is synced with the network to determine the seed management settings previously in place. The object storage system may, for example, choose to continue the seed management operations for the current instance, or implement alternative seed management operations per a given scenario. Whichever seed management protocol is chosen (with, or without, for example user participation), the seed download or seed update then proceeds per the new/existing/alternative configuration settings (step 812).

The method 800 then moves to step 814, which illustrates additional connection scenario functionality that the object storage environment may undertake in a particular scenario. If the seed update requirements exceed the size of the object transfer request (i.e., storage object the device seeks to read or write from the object storage environment), the method 800 then may move to step 816, which intelligently uses the portion of the seed file determined to already be existing on the connected device. This step is performed to save bandwidth resources and speed data transfer, for example. If the seed update requirements do not exceed the size of the object transfer request (again, step 814), then the method 800 moves to step 818, where the seed file update operation is performed per the selected seed management configuration settings. The method 800 then ends (step 820).

Figure 9:
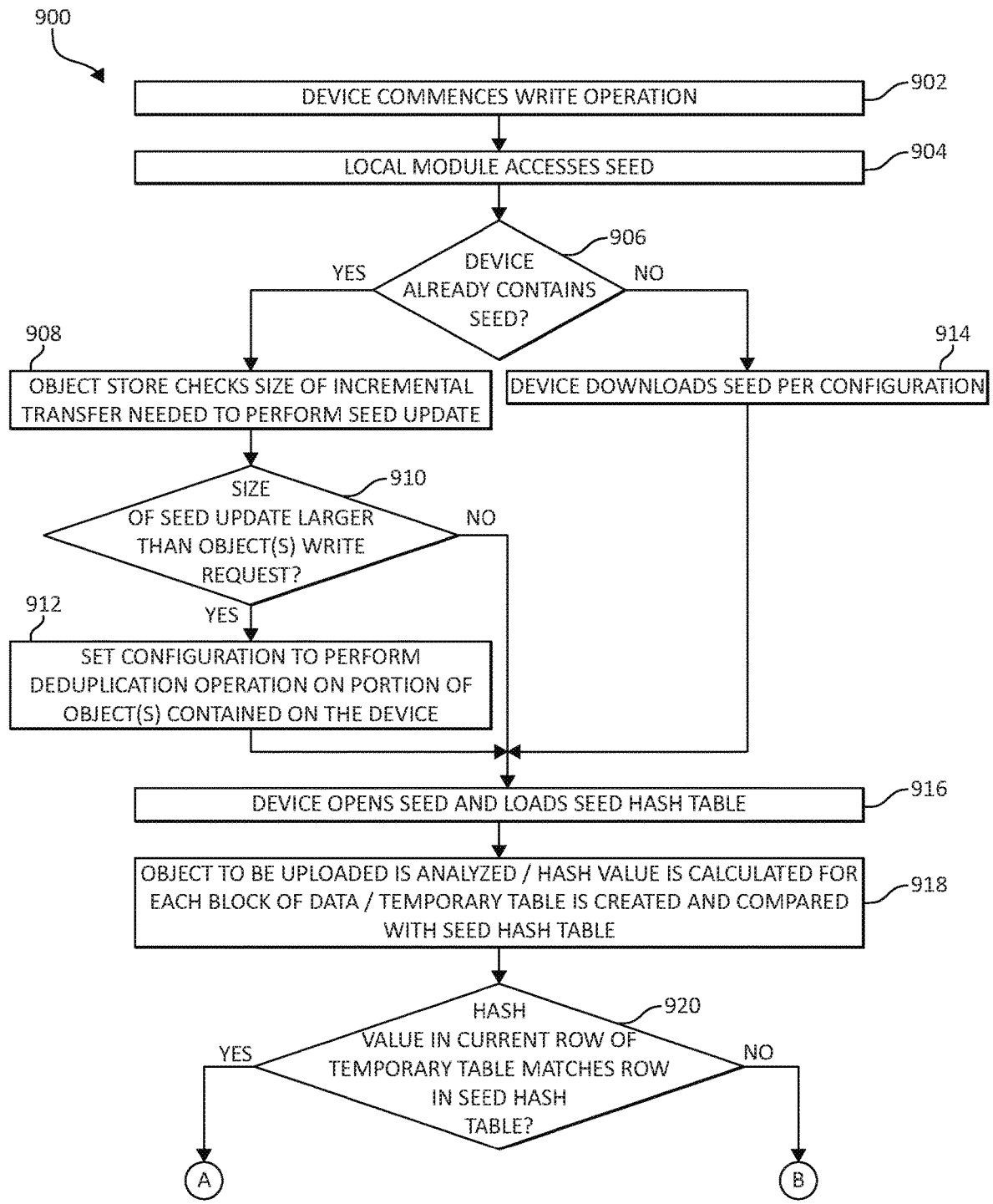
FIG. 9 is an additional flow chart diagram depicting exemplary functionality associated with performing a write operation using distributed computing components, again in which aspects of the present invention may be realized.
Figure 9:
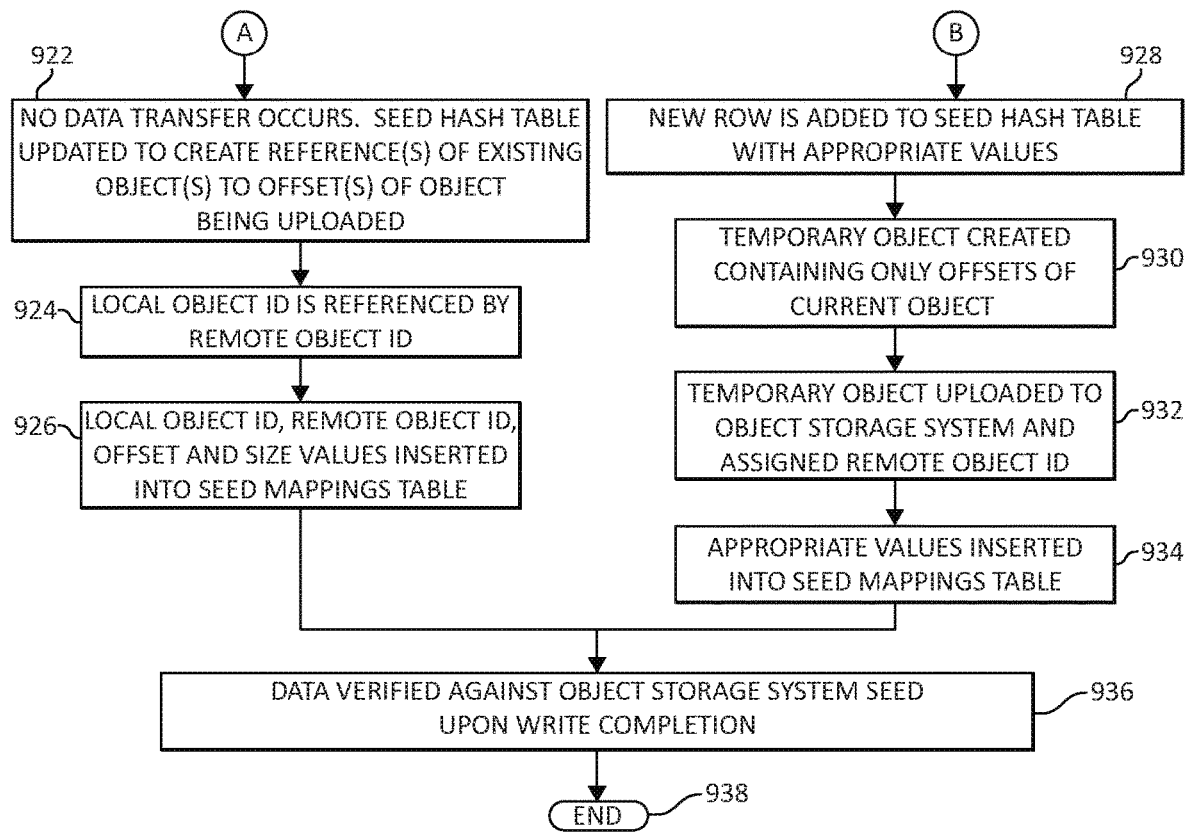

Turning now to FIG. 9, an exemplary method 900 for performing a write operation between a connected device and an object storage environment within and between distributed computing components is depicted, here again in which various aspects of the illustrated embodiments may be implemented. Method 900 begins as the connected device commences the write operation (step 902). The local module (executing on, or otherwise associated with, the local device) then accesses the applicable seed file (step 904).

The method 900 moves to step 906, which queries if the device already contains the seed file (or at least the necessary seed information from the seed applicable to the instant storage object being written). If so, the object storage environment then checks the size of the incremental transfer needed to perform the applicable seed file update (step 908). Then, if the size of the seed update is larger than the storage object(s) requiring transfer (step 910), the method 900 moves to step 912, which sets the appropriate configuration to perform the applicable deduplication operation on that portion of the object(s) contained on the local device (step 912). In one embodiment, the seed file may be encrypted, so only the device(s) requiring transfer and the object storage environment with the appropriate encryption key will be able to share the seed file information to perform the deduplication operation.

Returning to step 906, if the device already contains the seed file information, the method 900 moves to step 914, where the device downloads the seed file per the applicable seed management configuration. Returning to step 910, if the size of the applicable seed update is larger than the object(s) write request, then the method 900 moves to step 916, now as will be further described.

Once the device and/or the object storage environment follow steps 902-914 as previously described as applicable, the device opens the seed file and loads the seed hash table in step 916 (one of two data structures as will be further described). The hash table, in one embodiment, contains the calculated hash value of every storage object that already exists in the object storage environment. This hash value is calculated for each specified block of data within a particular storage object.

In a further step 918, the storage object that will be uploaded and written is analyzed, and for each specified block of data, a hash value is calculated. A temporary table is created. In one embodiment, the temporary table contains three columns (hash, local_object_id, and offset). For each row in the temporary table, the corresponding hash value is compared with the seed hash table previously described (step 918).

Turning now to decision step 920, if the hash value of the current row of the temporary table matches one of the rows in the seed hash table, then a new row is added to the seed hash table. In one embodiment, these rows contain the following fields: temp_table.hash, local_obj_id, local_offset, remote_obj_id, and remote_offset, with values temp_table.hash, temp_table.local_obj_id, temp_table.offs, seed.table1.remote_obj_id, and seed.table1.remote_offset. No actual data transfer occurs. Only the seed hash table is updated with the new rows, which creates the references of already existing objects to the offsets of the object that is being uploaded (step 922).

Method 900 then moves to step 924. In this case, the new row will indicate that a local_obj_id will be referenced by a remote_obj_id. This means that the specific offset of the local object will be provided by the offset of the remote object already stored in the object storage system. In the following step 926, the local object ID, remote object ID, offset and size values are inserted into the seed mappings table (i.e., seq, local_obj_id, remote_obj_id,offset, size) values (seq+1, temp_table.local_obj_id, seed.table1.remote_obj_id, seed.table1.remote_offset, <block-size>) to update the mappings table).

Returning to step 920, if the hash value of the current row of the temporary table (temp_table) does not match any of the rows in the seed file hash table, then a new row is added to the seed hash table (i.e., hash, local_obj_id, local_offset, remote_obj_id, remote_offset) with values (i.e., temp_table.hash, temp_table.local_obj_id, temp_table.offset, temp_table.local_obj_id, and temp_table.offset) (step 928). A temporary object will be created containing only offsets referenced once or offsets found in this step (step 930). The temporary object will be uploaded to the object storage system and a remote_obj_id will be assigned (step 932). In this case the local_obj_id and the remote_obj_id will be the same because this will be the only reference to the specific offset.

All subsequent objects will be referencing to this specific offset because it was the first one to be written to the disks in the object storage. In a following step 934, the appropriate sequence, local object ID, remote object id, offset and size information with accompanying values are inserted into the seed mappings table (i.e., seq, local_obj_id, remote_obj_id, offset, size) values (seq+1,temp_table.Local_obj_id, temp_table.local_obj_id, temp_table.offset, <block-size>) to update the mappings table).

Method 900 then moves to step 936, where, upon completion of the write, the data is checked against the back-end storage system's seed to check for any potentially missed deduplicable data that may have been transferred in instances where the seed download to the system was not conducted. The method 900 ends (step 938).

Figure 10:
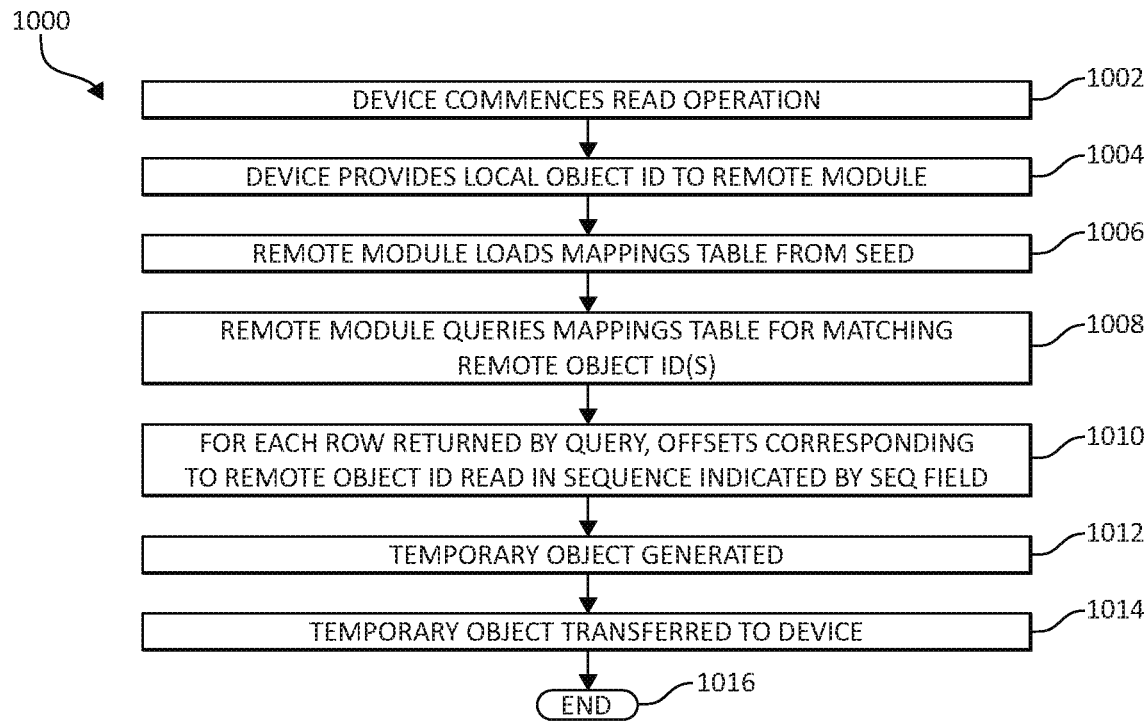
FIG. 10 is an additional flow chart diagram depicting exemplary functionality associated with performing a read operation using distributed computing components, again in which aspects of the present invention may be realized.

Turning now to FIG. 10, a method 1000 depicting an exemplary read operation by a connected device to the object storage environment within distributed computing components is shown, here again in which various aspects of the present invention may be implemented. During such a read operation, client devices may contact the object storage environment and request data using an object identifier. In one embodiment, the seed tables (hash, mapping) are used to translate the object identifier on the object storage environment, so the data may be transferred to the client system.

Method 1000 begins (step 1002) by the connected device commencing the read operation. When the device wishes to recover a particular storage object, the device requests the storage object by sending the local_obj_id to the remote module running in the object storage environment (step

1104). The remote module then loads the mappings table from the seed file (step 1006). The seed file mappings table, in one embodiment, contains the mapping between the local_obj_id requested by the consumer (using the connected device) and the remote_obj_id generated when the requested data was uploaded and previously deduplicated.

The remote module queries the mappings table for matching remote object ID's (step 1008). In order to reconstruct an object to be returned to the consumer, in one embodiment, the following query is issued: Select * from the mappings table where local_obj_id=PROVIDED_ID sort by seq. For each row returned by the query, the corresponding offset addresses to the remote_object_id are read, which will be in the sequence indicated by the seq field, and a temporary object is generated (step 1012). The temporary object is then transferred to the device (step 1014), and the method 1000 ends (step 1016).

Figure 11:
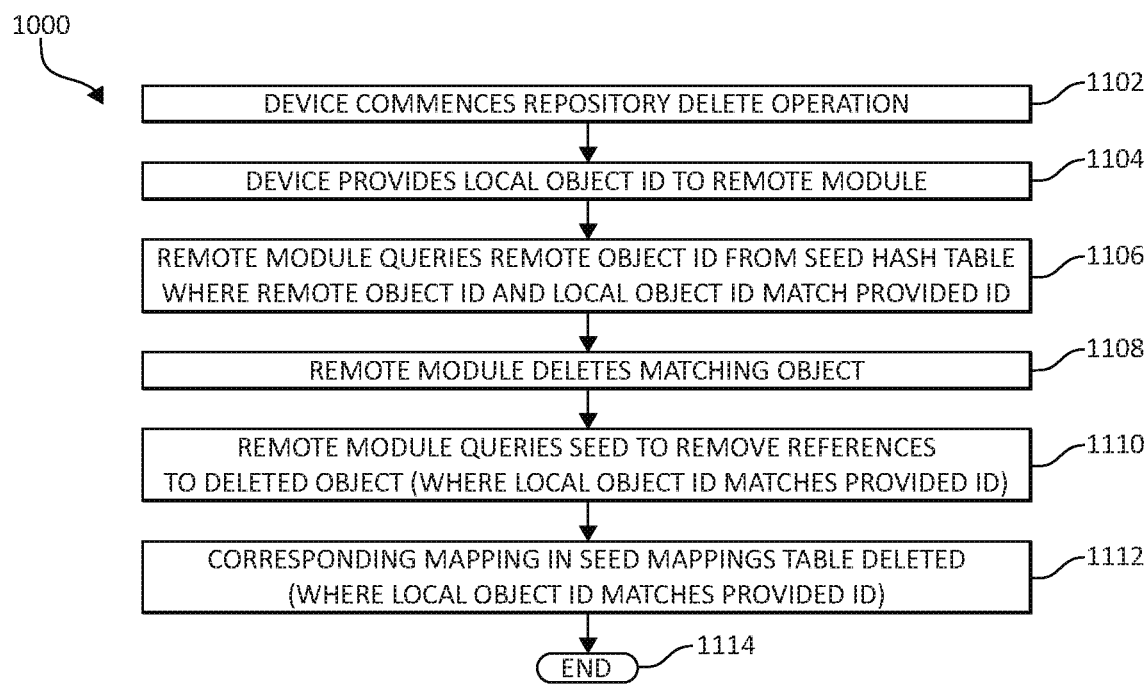
FIG. 11 is an additional flow chart diagram depicting exemplary functionality associated with performing a repository delete operation using distributed computing components, again in which aspects of the present invention may be realized.

Turning now to FIG. 11, a method 1100 depicting an exemplary repository delete operation by a connected device to the object storage environment within distributed computing components is shown, here again in which various aspects of the present invention may be implemented. Method 1100 begins with the connected device commencing the repository delete operation (step 1102). When a connected device wishes to delete a particular storage object from the object storage environment, the connected device provides the local_obj_id to the remote module running in the object storage environment (step 1104), and in one embodiment, the following query is executed: select remote_obj_id from seed hash table where remote_obj_id=local_obj_id and local_obj_id=PROVIDED_ID. In other words, the remote module queries the remote object ID from the seed hash table, where the remote object ID and the local object ID match the provided ID (step 1106). This first query will return the ID of the object that contains the unique data of the object that is being deleted. The remote module then proceeds to physically delete this object (step 1108).

A second query is then executed to remove the references to the deleted object (step 1110), which may proceed as follows, in one embodiment: delete from seed hash table where local_obj_id=PROVIDED_ID. Finally, the mapping is eliminated (step 1112), which may, in one embodiment, proceed as: delete from mapping table where local_obj_id=PROVIDED_ID. Note, a local delete (e.g., delete operation performed by the connected device on locally managed storage objects) may not necessarily correspond to a repository delete.

In one embodiment, the mechanisms of the present invention may organize individual storage objects using hashed metadata based upon specific block sizes. Multiple entries may exist in the hashed metadata database for multiple block sizes for a single storage object. Upon completion of a write operation to the object storage environment, written data may be compared against multiple block sizes to determine the optimum default block size for the particular storage object.

By intelligently using a seed file in combination with deduplication functionality in the context of devices connected through a network to an object storage environment in and between distributed computing components, the mechanisms of the illustrated embodiments improve resource utilization, increase bandwidth, reduce transfer time, enhance data synchronization, and a variety of additional attendant benefits. Use of object storage metadata to facilitate the seed file information and transfer allows for determinations as to which data should be, in effect, "pre-seeded" between devices to reduce data transfer times and improve other computing efficiencies. In essence, among other benefits of the illustrated embodiments, data deduplication functionality is leveraged to enhance the performance of the entire connected network, and not just for the reduction of storage space on a local component.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. In an object storage environment, a method for deduplicating data within and between distributed computing components by a processor, comprising:
    pairing a deduplication operation with metadata associated with a data object to determine data necessitating deduplication before the data object is transferred and written to a local node such that prior to transferring any portions of the data object from the object storage environment to the local node, the metadata associated with the data object is examined to determine those portions of the data object not required to be transferred according to the determination of the data necessitating deduplication; and
    initiating a seed file incorporating the data object metadata, the seed file having a plurality of table structures each containing descriptive fields pertaining to locations of each data object stored in the object storage environment; wherein a local module on the local node accesses the seed file for reference in identifying deduplicable data.

2. The method of claim 1, further including performing the pairing in a remote module executing on an object storage system within the distributed computing components.

3. The method of claim 1, further including transferring, from the object storage system within the distributed computing components to the local node, only those data objects identified as nonduplicate data by reference to the seed file.

4. The method of claim 3, further including initiating a first table in the seed file incorporating a calculated hash value of each data object already existing in the object storage environment.

5. The method of claim 4, further including initiating a second table in the seed file, which, when requested by the remote module, incorporates a mapping between a local data object identifier corresponding to a data object requested by a user and a remote data object identifier corresponding to a data object maintained by the object storage system.

6. The method of claim 5, further including generating, by the remote module, a temporary data object representing offsets corresponding to the data object maintained by the object storage system to be transferred to the user.

7. In an object storage environment, a system for deduplicating data within and between distributed computing components, comprising:
    a processor, integrated into one of the distributed computing components; and
    an additional processor associated with a local module on a local node, wherein the processor:
        pairs a deduplication operation with metadata associated with a data object to determine data necessitating deduplication before the data object is transferred and written to the local node such that prior to transferring any portions of the data object from the object storage environment to the local node, the metadata associated with the data object is examined to determine those portions of the data object not required to be transferred according to the determination of the data necessitating deduplication; and
        initiates a seed file incorporating the data object metadata, the seed file having a plurality of table structures each containing descriptive fields pertaining to locations of each data object stored in the object storage environment; wherein the additional processor associated with the local module on the local node accesses the seed file for reference in identifying deduplicable data.

8. The system of claim 7, wherein the processor pairs the deduplication operation in a remote module executing on an object storage system within the distributed computing components.

9. The system of claim 7, wherein the processor transfers, from the object storage system within the distributed computing components to the local node, only those data objects identified as nonduplicate data by reference to the seed file.

10. The system of claim 9, wherein the processor initiates a first table in the seed file incorporating a calculated hash value of each data object already existing in the object storage environment.

11. The system of claim 10, wherein the processor initiates a second table in the seed file, which, when requested by the remote module, incorporates a mapping between a local data object identifier corresponding to a data object requested by a user and a remote data object identifier corresponding to a data object maintained by the object storage system.

12. The system of claim 11, wherein the processor generates, by the remote module, a temporary data object representing offsets corresponding to the data object maintained by the object storage system to be transferred to the user.

13. In an object storage environment, a computer program product for deduplicating data within and between distributed computing components by a processor, the computer program product comprising a non-transitory computer-readable storage medium having computer-readable program code portions stored therein, the computer-readable program code portions comprising:
   an executable portion that pairs a deduplication operation with metadata associated with a data object to determine data necessitating deduplication before the data object is transferred and written to a local node such that prior to transferring any portions of the data object from the object storage environment to the local node, the metadata associated with the data object is examined to determine those portions of the data object not required to be transferred according to the determination of the data necessitating deduplication; and
   an executable portion that initiates a seed file incorporating the data object metadata, the seed file having a plurality of table structures each containing descriptive fields pertaining to locations of each data object stored in the object storage environment; wherein a local module on the local node accesses the seed file for reference in identifying deduplicable data.

14. The computer program product of claim 13, further including an executable portion that pairs in a remote module executing on an object storage system within the distributed computing components.

15. The computer program product of claim 13, further including an executable portion that transfers, from the object storage system within the distributed computing components to the local node, only those data objects identified as nonduplicate data by reference to the seed file.

16. The computer program product of claim 15, further including an executable portion that initiates a first table in the seed file incorporating a calculated hash value of each data object already existing in the object storage environment.

17. The computer program product of claim 16, further including an executable portion that initiates a second table in the seed file, which, when requested by the remote module, incorporates a mapping between a local data object identifier corresponding to a data object requested by a user and a remote data object identifier corresponding to a data object maintained by the object storage system.

18. The computer program product of claim 17, further including an executable portion that generates, by the remote module, a temporary data object representing offsets corresponding to the data object maintained by the object storage system to be transferred to the user.

* * * * *